Patented Aug. 31, 1937

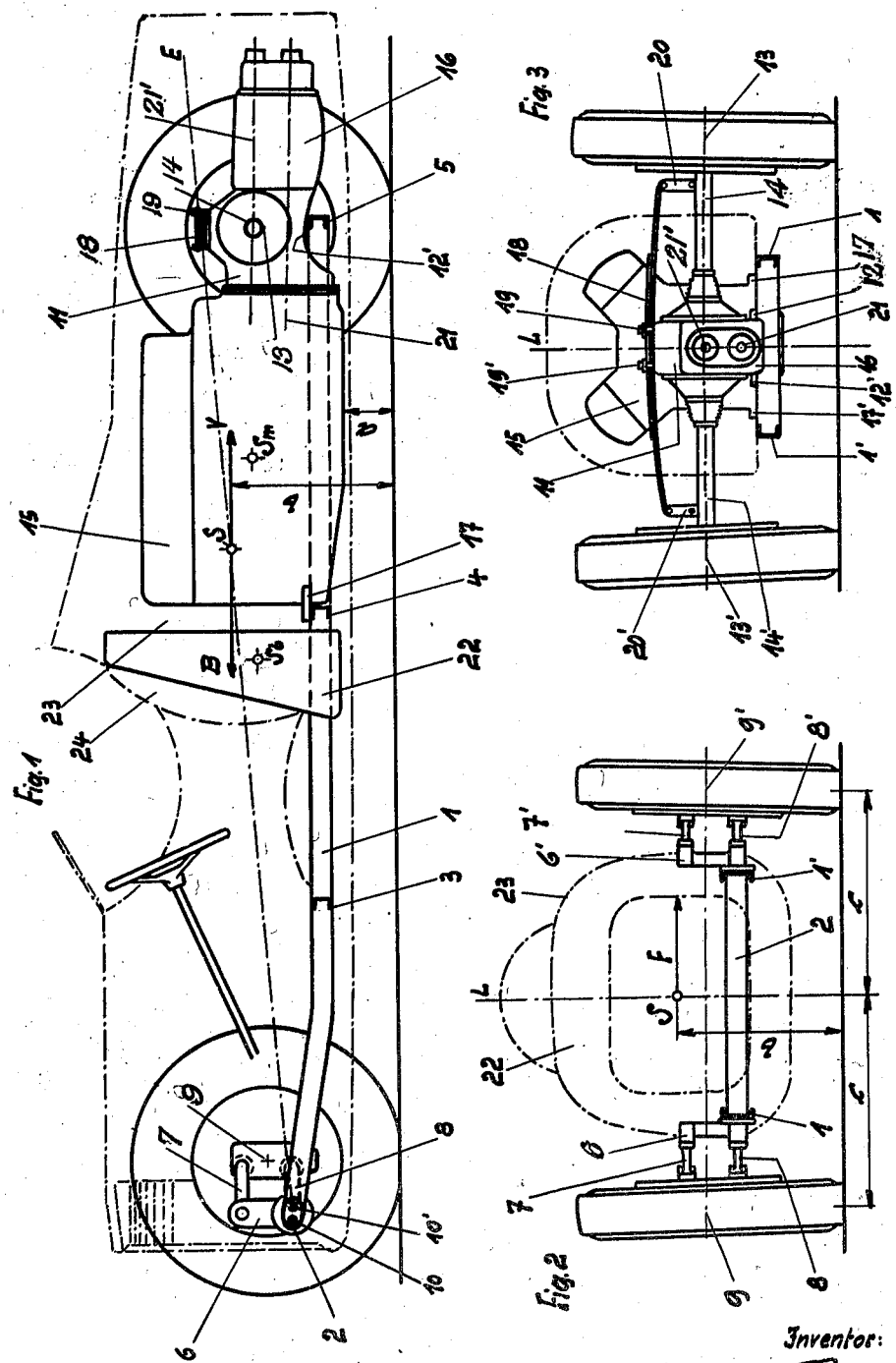

2,091,652

UNITED STATES PATENT OFFICE 2,091,652

MOTOR VEHICLE

Ferdinand Porsche, Stuttgart, Germany

Application April 27, 1934, Serial No. 722,750
In Germany May 2, 1933

7 Claims. (Cl. 180—54)

In order further to increase the speed of travel of motor vehicles, more especially of racing cars, without sacrificing driving safety, it is essential for the car not only to hold a road well along the straight-away, but also to have a good grip of the road and be capable of turning satisfactorily round curves. The inertia forces which are operative when the car is travelling round a curve very seriously influence both the hold on the road and the stability of the car. The centrifugal forces cause sideways inclinations of the chassis, which result in transverse oscillations of the car. Owing to the accelerating and retarding forces, longitudinal inclinations of the chassis occur, which lead to a rocking motion of the car. Finally, in consequence of variations in the adhesion of the wheels to the road surface, due to these inertia forces, turning motions of the chassis occur, which result in the car sluing. An object of this invention is to avoid all these disadvantages through a special arrangement and association of the sprung masses of the chassis, so that curves can be negotiated at a higher speed than heretofore and consequently higher average driving speeds become possible.

The invention relates to an arrangement wherein the gross centre of gravity of the sprung masses lies in the plane containing the spring supports and the individual centres of gravity of the main masses lie grouped closely about the gross centre of gravity. Through the gross centre of gravity of the sprung masses being lowered into the plane containing the spring supports, sideways inclinations of the car are entirely done away with. If the centrifugal forces acting in the gross centre of gravity of the sprung masses lie in the plane containing the spring supports, that is to say, the plane laid through the attaching places of all the car springs, no moment can act on the sprung masses of the car which could incline the latter laterally with respect to the road surface and through the reaction of the spring might cause transverse oscillations. The chassis will, on the contrary, seek only to slide laterally as a whole, as it is prevented from turning over by the centre of gravity being placed low. This arrangement however also results in the longitudinal oscillations being greatly reduced, for the retarding and accelerating forces which act in the gross centre of gravity of the sprung masses also lie in or approximately in the plane containing the spring supports, so that they can exert no moment or no appreciable moment with respect to the places where the springs are fixed, which might cause the car to incline in the longitudinal direction with respect to the road surface and consequently result in rocking. Through the main masses, that is to say the relatively heaviest sprung masses, being grouped about the gross centre of gravity of the sprung masses, which is lowered in this manner, it is sought to prevent any turning of the car about the vertical axis passing through the centre of gravity even with variations in the adhesions of the wheels owing to the inertia forces acting on the chassis. In this case the chassis, owing to the loads acting on it being grouped centrally, has such a small moment of inertia about this axis that the dangerous sluing of the car can be prevented, owing to the absence of an effective sluing moment. Through the combination of these two features, namely, a suitable lowering of the gross centre of gravity and the grouping of the main masses around it, both the stability and the road holding property can be greatly improved, that is to say, the car can be made both safe against tilting and turning over and also against rocking and sluing, so that even when driving round a sharp curve it lies on the road like a board.

In the case of motor vehicles for very high speeds of travel, especially in the case of racing cars, the engine and the fuel tank represent the relatively greatest individual masses and consequently the main masses of the chassis, so that the greatest importance attaches to their arrangement and association in the chassis. According to the invention the grouping of these main masses about the gross centre of gravity is effected by the engine being disposed immediately in front of the rear axle casing and the fuel tank immediately in front of the engine. For lowering the gross centre of gravity, the position of which is mainly determined by the main masses, according to the invention the shaft of the engine must be placed lower than the wheel centres and be carried through the axle casing to the change-speed gear lying directly behind the casing. By this means not only can the fuel tank but also the engine be placed low in the frame, for instance between the longitudinal frame members, and be brought as near the road surface as the necessary clearance will allow. The position of the fuel tank relative to the gross centre of gravity furthermore makes it possible that the reduction in the amount of fuel while travelling will have practically no influence on the distribution of the axle pressure and consequently on the driving properties of the vehicle, while the absolute position of the engine in the chassis facilitates the adoption of the block construction, in which the engine, the change-speed gear and the axle casing preferably form a single unit. The invention is illustrated in the accompanying drawing as applied to the chassis of a racing car.

Fig. 1 being a side elevation of the chassis partly in section, and

Figs. 2 and 3 the corresponding front and rear views.

The frame is built up from two longitudinal members 1, 1' and a plurality of transverse members 2 to 5. To the tubular front transverse member 2 bearing casings 6, 6' for the pairs of link members 7, 8 and 7', 8', which swing in the direction of travel and form a parallelogram support for the front wheels 9, 9', are connected. The lower link members 8, 8' are acted on each by a spring bar 10 and 10' respectively, which extends over the entire width of the frame. The outer end of the spring bars 10, 10' is in each case connected coaxially with the pivot pin of the link members 8, 8', while the inner end of the spring bars 10, 10' is moved somewhat out of the connecting line of the link pins and rests with its axis parallel to the said line in the abutment which is connected to the opposite longitudinal members 1, 1'. The spring bars 10, 10' are preferably enclosed in the hollow transverse member 2. To the rear transverse member 5 the axle casing 11 is fixed by suitable means such as screws 12, 12'. In the axle casing 11 are directly journalled the swinging half axles 14, 14' which support the rear driving wheels 13, 13'. To the front of the axle casing 11 is fixed by means of flanges the V-shaped engine 15 and to the back of the axle casing the change-speed gear housing 16. The engine 15 is preferably supported by means of the bracket 17, 17' on the transverse frame member 4. To the top of the axle casing 11 the transverse spring 18 is fixed by suitable means such as bolts 19, 19'. The ends of the transverse spring 18 are connected by means of the spring shackles 20, 20' to the swinging half axles 14, 14'. The shaft 21 of the engine 15 is journalled lower than the wheel centres 13, 13' and is led rearwardly through the axle casing 11 to the change-speed gear housing 16. The shaft 21 engages through sliding gear wheels with the pinion shaft 21' which extends forwardly from the change speed gear housing 16 at the level of the wheel centres 13, 13'. The transversely disposed fuel tank 22 is mounted just in front of the engine 15 and is fixed to the longitudinal frame members 1, 1'. It extends between the latter downwards and bears right against the side walls of the car body. The fuel tank 22 at the same time acts as the back rest of the seat 24.

The attachment points 19, 19' of the rear spring 18 and those of the front springs 10, 10' determine the plane E. The gross centre of gravity S of the sprung masses of the chassis lies in this plane. The line in which the centrifugal force F is assumed to act at the gross centre of gravity S lies also in this plane E, while the line in which the accelerating and retarding forces B, V are assumed to act at the gross centre of gravity S deviates by a small angle from the said plane E. The individual centre of gravity $Sm$ of the engine mass and the individual centre of gravity $Sb$ of the fuel tank mass lie a short distance behind and in front of the gross centre of gravity S. While the gross centre of gravity S is shown as lying above the points $Sb$ and $Sm$, attention is directed to the fact that the gross centre of gravity is determined by all the masses of the vehicle and not by those of the fuel tank and engine alone. These masses, many of which are relatively high, raise the point S slightly above the points $Sb$ and $Sm$. The engine 15 and the fuel tank 22 are brought to a minimum distance $a$ from the road surface. The distance $b$ of the gross centre of gravity S from the road surface is smaller than the distance $c$ of the wheels from the longitudinal central plane L of the chassis. When the car is travelling round a curve the chassis cannot tilt under the action of the centrifugal force F with respect to the wheels 9', 13'. The bearing pressures under this centrifugal force F pass through the fixing places 19, 19' of the rear spring 18 and through those of the front springs 10, 10', so that they cannot exert a torque on the supporting plane E and consequently on the chassis. The chassis also could not turn over about the bottom points of the wheels 9', 13', as these wheels cannot provide the necessary road friction for this purpose. The chassis is therefore safe both as regards tilting and turning over and can at the worst only slide sideways. At the same time the danger of the car sluing, for instance due to an unequal adhesion of the wheels on the road surface, is greatly reduced, as the individual centres of gravity $Sm$, $Sb$ of the main masses 15, 22 are only at a short distance from the vertical axis of rotation passing through the gross centre of gravity S and thus only a very small sluing moment can act on the chassis. When accelerating and when applying the brakes the inertia forces V or B act approximately horizontally in the direction of travel on the gross centre of gravity S. As the lines of action of these inertia forces are only very little out of the slightly forwardly inclined supporting plane E, only a very small torque can be exerted on the latter and consequently on the chassis. Under the action of the inertia forces B, V the car is pressed neither appreciably on the front springs 10, 10' nor on the rear spring 18. Hence the chassis is substantially free from sluing and rocking.

The driving shaft 21 is preferably carried through rearwardly below the wheel centres 13, 13' in order to enable the engine 15 to be mounted in the chassis at the minimum distance $a$ from the road surface. As the engine 15 is the heaviest individual mass of the chassis, the low position of the gross centre of gravity S is thereby substantially determined and the distance $b$ of the centre of gravity is also reduced to a minimum. The fuel tank 22 is brought up close to the side walls of the car body, in order that it may form a pressure-, heat- and sound-proof partition between the engine 15 and the driver's seat 24 with simple means. This makes it possible to do without a special transverse wall in the chassis between the engine space and the driver's space, which results in a reduction of the weight and a simplification in the manufacture of the car. Through the fuel tank 22 being placed very close to the gross centre of gravity S, a shifting of the centre of gravity S with a change in the amount of fuel in the tank or when the fuel gives out while the car is travelling is prevented in a very simple manner.

The invention is not limited to this constructional example. For the invention it is immaterial in what particular way the wheels are guided and sprung with respect to the chassis, as the supporting plane E can always be absolutely fixed. It is therefore immaterial as regards the invention whether the gross centre of gravity S is approached nearer the rear axle or nearer the front axle, if only it lies in or approximately in the particular supporting plane E. The absolute position of the engine and of the fuel tank in the chassis may also vary considerably if provision only be made that through their relative position a grouping of the individual centres of gravity about the gross centre of gravity is insured.

The word "frame" as herein used is not to be understood as limited to such a device when formed separate from the body or coachwork of the vehicle, but as including such devices when formed integral with said body or coachwork.

It will be seen therefore that I have provided a device which fulfills the objects primarily stated above and while I have shown a single embodiment of my invention, it is clear that other forms thereof may readily be provided without departing from my invention as defined in the claims which follow.

What I claim is:

1. In a vehicle having a chassis, engine and fuel tank, the combination of a chassis including front and rear suspension springs attached thereto at points which are substantially in a plane with the center of gravity of the entire vehicle, and a plurality of main vehicle masses including the engine and fuel tank, the individual centers of gravity of which are grouped closely around the center of gravity of the vehicle.

2. A chassis for motor vehicles including front and rear suspension springs attached thereto at points which are substantially in a plane with the center of gravity of the entire vehicle, a plurality of masses including a motor and fuel tank so arranged that their individual centres of gravity are grouped closely around the centre of gravity of the vehicle, and a rear axle casing, the motor being arranged directly in front of said casing and the fuel tank directly in front of the motor.

3. A chassis for motor vehicles including front and rear suspension springs attached thereto at points which are substantially in a plane with the center of gravity of the entire vehicle, a plurality of masses including a motor with drive shaft and fuel tank so arranged that their individual centres of gravity are grouped closely around the centre of gravity of the vehicle, a rear axle casing arranged directly at the rear of the motor, rear wheels associated with said casing, and a change speed gear arranged directly at the rear of the said casing, the fuel tank being arranged directly in front of the motor and the shaft of the latter extending through said casing below the rear wheel centres to the change speed gear.

4. A chassis for motor vehicles including front and rear suspension springs attached thereto at points substantially in a plane with the center of gravity of the entire vehicle, a plurality of masses including a motor with drive shaft and fuel tank so arranged that their individual centres of gravity are grouped closely around the centre of gravity of the vehicle, a rear axle casing arranged directly at the rear of the motor, rear wheels associated with said casing and a change speed gear arranged directly at the rear of the said casing, the fuel tank being arranged directly in front of the motor and the shaft of the latter extending through said casing below the rear wheel centres to the change speed gear, and a driver's seat arranged in front of the fuel tank with the latter forming a partition between said seat and the motor.

5. A motor vehicle comprising front and rear road wheels, a frame supported thereon, a driving motor, a fuel tank therefor located transversely of the frame and forward of the motor, and a driver's seat, the rear of which is supported over its entire area by said fuel tank, whereby said driver's seat is protected from the heat and noise of the engine.

6. In a vehicle having a chassis, engine, and fuel tank, the combination of a chassis including front and rear suspension springs attached thereto at points which are substantially in a plane with the center of gravity of the entire vehicle, said fuel tank and fuel constituting a main vehicle mass the center of gravity of which is positioned near the center of gravity of the entire vehicle.

7. The combination according to claim 6 in which the center of gravity of the fuel tank also lies approximately in the longitudinal plane of the center of gravity of the entire vehicle.

FERDINAND PORSCHE.